United States Patent [19]
Driskill

[11] 4,152,076
[45] May 1, 1979

[54] EXTRUDER AND METHOD FOR UNIFORMLY FLUXING AND BLENDING THERMOPLASTIC MATERIALS

[75] Inventor: Roger D. Driskill, Seymour, Conn.

[73] Assignee: General Electric Company, New York, N.Y.

[21] Appl. No.: 777,159

[22] Filed: Mar. 14, 1977

Related U.S. Application Data

[62] Division of Ser. No. 600,458, Jul. 30, 1975.

[51] Int. Cl.² ............................................. B29B 1/06
[52] U.S. Cl. ...................................... 366/79; 366/87; 366/319; 425/207
[58] Field of Search ..................... 366/76, 77, 69, 79, 366/80, 81, 87, 88, 89; 425/376, 377, 208, 209, 207

[56] References Cited

U.S. PATENT DOCUMENTS

| | | | |
|---|---|---|---|
| 3,555,616 | 1/1971 | Parks | 425/209 |
| 3,865,354 | 2/1975 | Burpulis | 366/76 |
| 3,942,774 | 3/1976 | Sokolow | 366/77 |

*Primary Examiner*—Robert W. Jenkins
*Attorney, Agent, or Firm*—R. G. Simkins

[57] ABSTRACT

An extruder apparatus with an extrusion screw having an end member which blends molten and solid thermoplastic materials moving through the apparatus into a uniformly fluxed consistency, and a method for uniformly fluxing and blending thermoplastic materials. The extrusion screw end member is provided with a conical terminus forming an annular shoulder with openings extending therethrough.

3 Claims, 3 Drawing Figures

EXTRUDER AND METHOD FOR UNIFORMLY FLUXING AND BLENDING THERMOPLASTIC MATERIALS

This is a division, of application Ser. No. 600,458, filed July 30, 1975.

BACKGROUND OF THE INVENTION

In typical extrusion manufacturing systems employing thermoplastic materials, or compounds thereof, the components of the molding stock are preblended to a substantially homogeneous mix or consistency in a preliminary operation such as with a Banbury or rubber roll mill. The essentially homogeneous molding stock from the preblending is then fed into and continuously processed through an extrusion molding apparatus which plasticizes or fluxes the homogeneous molding stock and then molds the plasticized or fluxed homogeneous material to shape.

When plasticizing or fluxing thermoplastic materials in conventional extrusion apparatus, the mechanical forces and uneven temperature conditions induce a separation of the melting thermoplastic material from the remaining solid material whereupon the molten and solid phases segregate themselves as they advance through the apparatus. The molten phase tends to migrate to the upstream area of the extruder screw channel or section between the screw flights whereas the remaining solid phase tends to migrate to the downstream area or side. Accordingly, in order to achieve a substantially uniform consistency or degree of melting or fluxing throughout the mass of thermoplastic compound or stock advancing through the apparatus, it has been customary to extend the duration of the extruder plasticizing operation by employing an apparatus of protracted length, i.e., increased length over dimension (L/D) ratio, or utilize complex and costly devices such as dual screw mixing extruders, or intricate screw designs.

However, the use of an extruder of extensive length or prolonged periods of working or plastication within the apparatus greatly increase the likelihood of over heating and thermal degradation of the compound or heat sensitive ingredients thereof, or premature curing or scorching if a curing agent is present, because of the lack of precision and/or uniformity of temperature control in conventional extrusion apparatus and methods. The relatively low thermal conductivity of organic polymeric materials and typical fillers for molding compounds significantly contributes to the occurrence of uneven temperature condition and localized overheating within the molding stock undergoing extrusion. Moreover, because of the heat sink effect of the mass of metal constituting the extruder apparatus, temperature regulation within the extruder is slow in response.

SUMMARY OF THE INVENTION

This invention comprises a new extrusion apparatus and method of extruding which uniformly fluxes and blends thermoplastic polymeric materials and compounds comprising thermoplastic polymers and other ingredients such as fillers and auxiliary ingredients. The distinctive extrusion apparatus and method of extruding of the invention are particularly directed to and useful in the continuous extrusion molding from a molding stock provided or supplied to the extruder in the form of discrete particulate bodies such as pellets or granules, and which may not be of a substantially homogeneous consistency or mix of the constituents of the molding compound, including particles of substantially or wholly of a single ingredient such as thermoplastic polymer.

The extrusion apparatus of this invention specifically comprises an extrusion screw having an end member which effectively combines and intermingles any segregated portions or ingredients of the molding stock or compound including the thermoplastic material and any molten and solid phases thereof, and thereby uniformly blends all components and phases into a uniformly fluxed consistency.

The method of this invention comprises a system of manipulating the molding stock or ingredients advancing within an extruder apparatus whereby any segregated components or phases thereof are recombined and intermingled together to produce a substantially uniformly fluxed and blended molding stock or compound.

OBJECTS OF THE INVENTION

It is a primary object of this invention to provide an extrusion apparatus and method of extruding which produce a uniform fluxing and blending of thermoplastic molding material or compounds including the same.

It is also a primary object of this invention to provide an extrusion apparatus and method of extruding which uniformly fluxes and blends molding stocks of thermoplastic polymers or compounds containing the same supplied in particulate form such as pellets or granules.

It is a further object of this invention to provide an extrusion apparatus and method of extruding molding stocks comprising thermoplastic material which very rapidly achieve a uniform fluxing or plasticizing and blending of the molding stock or ingredients thereof within a section and duration of relatively short length and time whereby the usual hazards of heat degradation, and/or premature curing or scorching of compounds containing curing agents are eliminated or minimized.

It is a still further object of this invention to provide an extruder apparatus and method of extruding which combines or recombines and intermingles together any separated components or phases of the molding stock material, including segregated portions thereof, and rapidly produces a plasticized molding stock of a uniform blend and flux or melt consistency.

DESCRIPTION OF A PREFERRED EMBODIMENT

Figure 1:
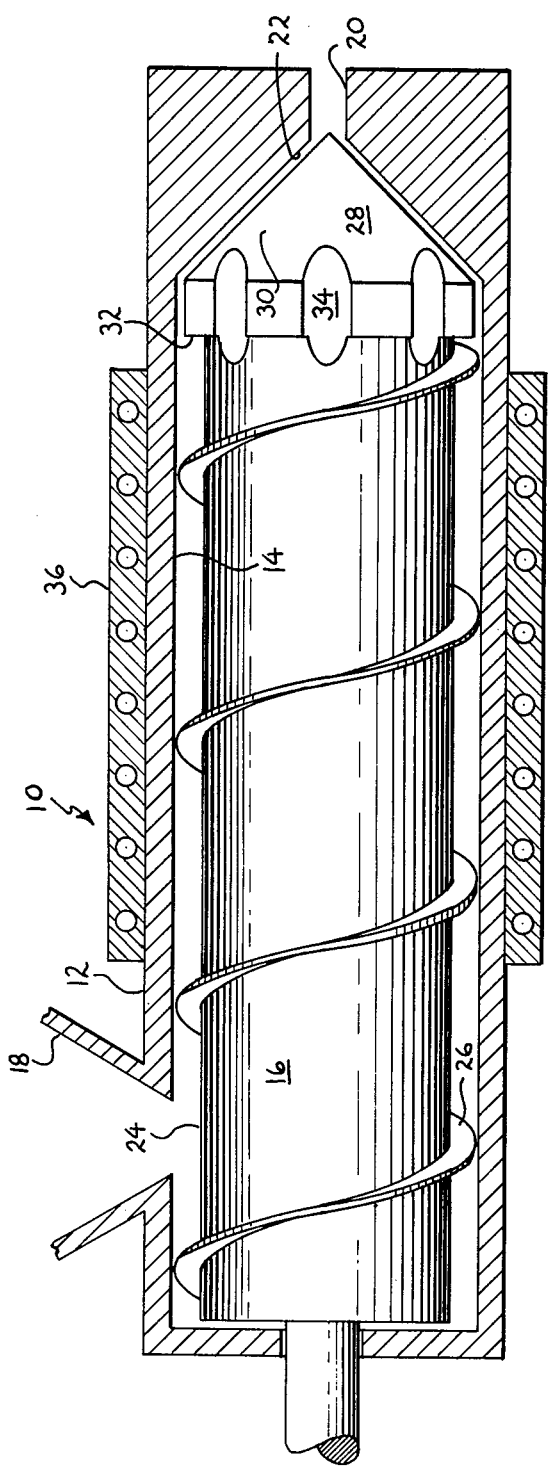
FIG. 1 is a partially sectionalized view of the extrusion apparatus of this invention showing the extruder screw in elevation.
Figure 3:
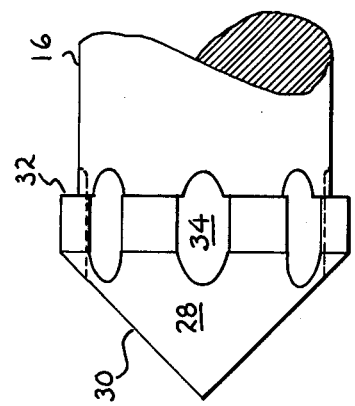
FIG. 3 is a side view in elevation of the end member of the extruder screw.
Figure 2:
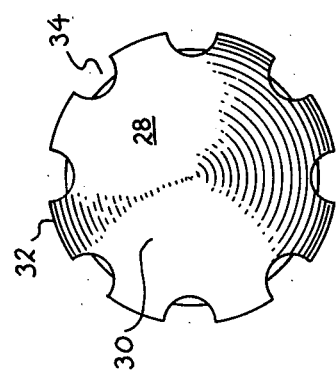
FIG. 2 is an end view of the extruder screw end member.

In accordance with the present invention, an extrusion apparatus and a method of extruding are provided which produce a uniform fluxing and mixing, or plasticized state, in continuously supplied molding stock containing thermoplastic material preparatory to its continuous molding into a product such as an electrically insulating coating covering a metallic wire or other elongated conductor. The invention includes the operations of feeding and continuously advancing a mass of molding stock containing thermoplastic polymeric material under compression longitudinally through the extruder barrel in a helical path about the extruder screw; heating the advancing molding stock to plasticize it by externally applied heat or heat generated within the molding stock due to shear-induced internal friction, or both, and thereby plasticizing and melting at least a portion of the advancing thermoplastic material of the molding stock; obstructing or damming the continuous advancement of the melting molding stock comprising any separating molten and solid phases of the thermoplastic material, transversely across its longitudinal direction of advancement in a helical path about the extruder screw; forming a plurality of individual streams of the obstructed molding stock, including any molten and solid phases thereof, spaced about the periphery of the extrusion screw and passing said streams of the molding stock through the obstruction; and combining and convolutely intermingling the individual streams of molding stock containing any molten and solid phases of the thermoplastic material under high compression and in a spiral flow pattern counter to the helical path of the molding stock about the extruder screw, whereby the ingredients and any molten and solid phases of the molding stock are intimately blended to a uniform consistency and state of flux.

Referring to the drawing, the extruder apparatus 10 includes a housing with a cylindrical chamber 12 forming an extruder barrel 14, and an extrusion screw 16 positioned in the barrel.

The extruder barrel 14 is provided with an inlet port 18 adjacent to the extruder's upstream end for the introduction and feeding of molding stock, and an egress passage or orifice 20 at the downstream end of the barrel for the egress of the molding stock therefrom. Passage 20 is of greatly restricted cross-sectional area in relation to the extruder barrel, and is concentrically positioned with respect to the longitudinal axis of the cylindrical chamber forming the extruder barrel. Passage 20 is provided with a funnel-like, symmetrically converging, and preferably conical, entry portion 22.

The extruder screw 16, comprises a shaft 24 provided with one or more helical ribs 26 which provide a channel therebetween extending substantially along the length of the screw shaft 24 for the compression and movement of the molding stock in a helical path around the screw and its continuous advancement along the length of the extrusion chamber 12 or barrel 14. The extrusion screw 16, is rotated by any apt means such as an electric or hydraulic motor, not shown, in a conventional manner. Also, the extruder screw may be mounted so as to be axially movable within the cylindrical chamber 12 so that the distance between the end of the screw and the passage 20 with its converging entry portion 22 can be regulated.

The extruder screw shaft 24 is provided on its downstream end with a head member 28 having a conical end portion 30 of a slope or apex angle which substantially complements or conforms to the slope of the symmetrically converging or conical entry portion 22 of the restricted passage 20. Conical portion 30 continues radially outward at substantially the same angle or slope beyond the diameter of the shaft 24 and extends substantially to the inner surface of the cylindrical chamber 14 to form a circumferential shoulder portion 32 or flange. The shoulder portion 32 provides an annular barrier or dam transverse to the longitudinal movement of the molding stock advancing through the extruder barrel in a helical path about the screw. A plurality of openings 34 such as channels or ports are provided spaced around and extending through the shoulder portion 32 of the head member 28.

In operation, a molding stock such as a compound comprising a thermoplastic polymer of ethylene and clay filler, is fed into the cylindrical chamber 12 via port 18 at a rate or in amount to keep the extruder barrel 14 sufficiently full so as to provide a continuous advancement of the molding stock therethrough under compression and its consolidation therein to a continuum. The molding stock is heated by means of either an external or internal heat source, or both, as it advances along the length of the extruder barrel 14 towards the passage 20 under compression in a helical path about the screw 16. An external heat source can comprise a heating unit 36 placed about the extruder barrel 14 and providing for the passage of heating fluids such as hot water or steam, or electrical heaters can be used.

As the thermoplastic, such as an ethylene polymer, component of the molding stock melts, the molten phase thereof tends to drift or migrate back to the upstream side of the channel formed between the screw rib 24 or flight while the unmelted solid tends to migrate forward to the downstream side of the same section of the channel. This segregated condition of the melt from the solid is maintained within the channel as the molding stock progresses on through the extruder barrel unless the temperature and dwell time provided by the extruder barrel length are sufficient to complete the melting of all the thermoplastic contents of the molding stock. However, prolonged heating to insure completion of the melting and uniform fluxing exposes the molding stock to possible over-heating.

In accordance with this invention, the advancement under compression of the molding stock comprising separated molten and solid thermoplastic material, is obstructed or dammed transversely across its direction of movement longitudinally through the extruder barrel in a helical path of travel by the circumferential shoulder portion 32 of the screw head member around the entire perimeter of the screw. The obstructed molding stock is then divided into a plurality of individual streams by means of the multiple openings 34 spaced around the periphery of the shoulder portion 32 and passed through the barrier provided by the shoulder. If the molding stock within the screw channel approaching the barrier includes any segregated molten and solid material or is otherwise not uniform in temperature or consistency, the spaced openings in the barrier form individual streams of the molding stock containing different melt to solid ratios or composition consistencies, or both.

Upon passing through the openings in the barrier, the individual streams of molding stock containing differing melt to solid ratios and/or composition consistencies are combined or reunited and intimately intermingled together under conditions of high shear and turbulence by passage under increased compression intermediate the rotating conical portion 30 of the screw head member 28 and the stationary complementing converging entry portion 22 leading to the passage 20. Due to the rotation of the extruder screw 16, the individual streams of molding stock flow from the openings 34 into the confined region intermediate the conical end portion 30 and entry portion 22 in a spiral flow pattern counter to the prior helical path of advancement about the extruder screw. The thus redirected streams of molding stock composed of differing melt to solid ratios and/or composition consistencies spiral together under a high degree of compression and agitation whereby the nonuniform stock is convolutely recombined and thoroughly intermingled to a substantially uniform state of flux, temperature and consistency within a relatively brief space and duration of undergoing concentrated high shear conditions. This brief exposure to excessive or concentration shear conditions and the temperatures generated thereby, minimizes the possibility of overheating the stock or damage due thereto.

In a preferred embodiment of this invention, the cross-sectional area of the restricted passage 20 in relation to the cross-section area of the cylindrical chamber 12 of the extruder should be less than about 1/5 the area of the cylindrical chamber, or in a ratio of about 0.05–0.2/1 with a ratio of about 0.1/1 preferred. Also, the apex angle or slope of the conical portion 30 and of the complementing converging entry portion 22 with respect to the extruder's longitudinal axis should be within the range of about 20° to about 60° to provide an apt degree and period of convolute blending under the condition of high shear imposed. An angle of about 45° is suitable for most apparatus. The number of openings 34 annularly spaced about the shoulder portion 32 should be at least 4 and preferably about 6 to about 12, with about 8 an optimum construction.

The intensity of the shear forces applied to the molding stock spiraling intermediate the conical portion 30 and the complementing converging or conical entry portion 22 can be adjusted and governed by the axially reciprocal movement of the extruder screw 16 towards or away from the converging entry portion 22 whereby the area or extent of space between the conical portion 30 and converging entry portion 22 is regulated.

The extrusion apparatus and method of extruding of this invention are particularly useful and advantageous in the molding of products from the thermoplastic polyolefins, for example, polymers of ethylene, comprising polyethylene, blends of polyethylene and other thermoplastic polymers and copolymers of ethylene and other polymers polymerizable with ethylene, such as ethylene vinyl acetate copolymers and ethylene propylene copolymers and terpolymer. Molding compositions of these thermoplastic polymeric materials can include fillers and other materials or agents which are not thermoplastic.

Also, this invention is especially applicable to and advantageous with such thermoplastic molding compounds including heat activated curing agents such as free radical forming organic peroxide curing agents which cause the formation of cross-linking bonds to convert the thermoplastic polymer to an infusible and insoluble condition. The invention enables the attainment of uniformity of flux, temperature and consistency within only a very brief term of high shear mixing whereby the possibility of any precuring or scorching of such heat curable molding compounds is overcome or minimized.

The invention is also useful in two stage extruding systems wherein the molding compound is preconditioned at relatively low temperatures or moderate mixing conditions in a preceding extruder unit and then subsequently worked at relatively higher temperatures or more vigorous mixing conditions in a subsequent extruder unit for molding to shape. The apparatus and method of this invention provide for effective and uniform fluxing and blending of the molding stock in a preliminary operation without any extensive exposure to high temperature, shear, or other conditions which might accelerate the curing or introduce deteriorating influences prior to its final processing, molding to shape and then curing.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. A method of uniformly and extruding thermoplastic molding material comprising continuously advancing a mass of thermoplastic molding material longitudinally through an extruder barrel under compression and in a helical path about an extruder screw while heating said advancing thermoplastic molding material and melting a portion thereof whereby the molten material separates from the remaining solid material, obstructing the longitudinal advancement of the mass of melting thermoplastic material transversely to its longitudinal advancement, forming a plurality of individual streams of obstructed thermoplastic molding material including separated molten and solid material transversing the obstruction, and combining said plurality of individual streams of melting thermoplastic molding material under high compression in a spiral flow pattern counter to the helical path of the thermoplastic molding material about the extruder screw whereby the melting thermoplastic molding material is intensively convolutely blended together to a substantially uniform state of flux.

2. A method of uniformly fluxing and extruding thermoplastic molding material comprising continuously advancing a mass of thermoplastic molding material longitudinally through an extruder barrel under compression and in a helical path about an extruder screw while heating said advancing thermoplastic molding material and melting a portion thereof whereby the molten material separates from the remaining solid material, obstructing the longitudinal advancement of the melting mass of thermoplastic molding material traversely to its longitudinal advancement and about its helical path, forming a plurality of individual streams of obstructed thermoplastic molding material including separated molten and solid material traversing the obstruction at a series of spaced apart locations about the helical path, and combining said plurality of individual streams of melting thermoplastic molding material under high compression and shear in a spiral flow pattern counter to the helical path of the melting thermoplastic molding material about the extruder screw whereby the melting thermoplastic molding material and separated molten and solid material are intensively convolutely blended together to a substantially uniform state of flux.

3. A method of uniformly fluxing and extruding thermoplastic molding material comprising continuously advancing a mass of thermoplastic polyolefin molding material longitudinally through an extruder barrel under compression in a helical path about an extruder screw while heating said advancing thermoplastic polyolefin material and melting a portion thereof whereby the molten material separates from the remaining solid material, obstructing the longitudinal advancement of the mass of melting thermoplastic polyolefin material comprising separating molten and solid material, forming a plurality of individual streams of the melting thermoplastic polyolefin material from said obstructed mass of melting thermoplastic polyolefin material at a series of locations around the obstructed mass, and combining said plurality of individual streams of melting thermoplastic polyolefin material under high compression in a spiral flow pattern counter to the helical path of the thermoplastic polyolefin material about the extruder screw whereby the melting thermoplastic polyolefin material is intensively convolutely blended together to a substantially uniform state of flux.

* * * * *